United States Patent
Hallgarten et al.

(10) Patent No.: US 12,553,733 B2
(45) Date of Patent: Feb. 17, 2026

(54) COMPUTER-IMPLEMENTED METHOD FOR BEHAVIOR PLANNING OF AN AT LEAST PARTIALLY AUTOMATED EGO VEHICLE WITH A SPECIFIED NAVIGATION DESTINATION

(71) Applicant: Robert Bosch GmbH, Stuttgart (DE)

(72) Inventors: Marcel Hallgarten, Ehningen (DE); Martin Stoll, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 94 days.

(21) Appl. No.: 18/406,737

(22) Filed: Jan. 8, 2024

(65) Prior Publication Data
US 2024/0255297 A1 Aug. 1, 2024

(30) Foreign Application Priority Data
Jan. 31, 2023 (DE) ...................... 10 2023 200 757.6

(51) Int. Cl.
*G01C 21/34* (2006.01)
*B60W 60/00* (2020.01)
*G01C 21/36* (2006.01)

(52) U.S. Cl.
CPC ....... *G01C 21/3492* (2013.01); *B60W 60/001* (2020.02); *G01C 21/3605* (2013.01)

(58) Field of Classification Search
CPC ......... B60W 60/0027; B60W 60/0011; B60W 50/0097; G06F 16/9024
See application file for complete search history.

(56) References Cited

U.S. PATENT DOCUMENTS

| | | | |
|---|---|---|---|
| 2022/0306156 A1* | 9/2022 | Wray | G06V 20/588 |
| 2023/0008285 A1* | 1/2023 | Ma | G06F 16/9027 |
| 2023/0152813 A1* | 5/2023 | Joseph | G05D 1/617 |
| | | | 701/2 |

OTHER PUBLICATIONS

Deo et al., "Multimodal Trajectory Prediction Conditioned on Lane-Graph Traversals," 5th Conference on Robot Learning (CORL 2021), 2021, pp. 1-10. <https://proceedings.mlr.press/v164/deo22a/deo22a.pdf> downloaded Jan. 8, 2024.

* cited by examiner

*Primary Examiner* — Kenneth J Malkowski
(74) *Attorney, Agent, or Firm* — NORTON ROSE FULBRIGHT US LLP

(57) ABSTRACT

A computer-implemented method for behavior planning of an at least partially automated ego vehicle having a specified navigation destination. The method includes: generating a graph-based scene representation of the current traffic scene, wherein the graph of the scene representation is defined by a set of nodes and directed edges, each directed edge connecting exactly two nodes, wherein the nodes and/or the edges are associated with map information, and wherein each directed edge is associated with a transition probability for a correspondingly directed transition of the ego vehicle between the connected nodes; planning driving maneuvers, taking into account a future development of the traffic scene. At least a portion of the generated transition probabilities of the scene representation is modified with respect to the specified navigation destination, and that the scene representation having the modified transition probabilities is used for the planning.

18 Claims, 2 Drawing Sheets

COMPUTER-IMPLEMENTED METHOD FOR BEHAVIOR PLANNING OF AN AT LEAST PARTIALLY AUTOMATED EGO VEHICLE WITH A SPECIFIED NAVIGATION DESTINATION

CROSS REFERENCE

The present application claims the benefit under 35 U.S.C. § 119 of German Patent Application No. DE 10 2023 200 757.6 filed on Jan. 31, 2023, which is expressly incorporated herein by reference in its entirety.

FIELD

The present invention relates to a computer-implemented method for behavior planning of an at least partially automated ego vehicle with a specified navigation destination.

BACKGROUND INFORMATION

The task of autonomous driving is to control a ego vehicle using on-board sensor technology, e.g., radar, lidar, and/or RGB cameras, usually supplemented by non-vehicle sources of information, e.g., map information, GPS data, infrastructure sensors, weather stations, etc., so that a specified navigation destination is reached as quickly, conveniently, and safely as possible. In this context, for example, care must be taken to avoid collisions with other road users and immobile objects in the traffic scene and to comply with applicable traffic regulations.

This task is usually divided into the sub-tasks of perception, prediction, planning, and control or monitoring.

The task of perception is to fuse the sensor data captured by the ego vehicle and the non-vehicle-based information to extract relevant information about the current traffic scene, such as the position of other road users and immobile objects; classification or detection of the other road users and immobile objects; detection and identification of roadway markings, traffic signs, etc.

The task of prediction is to generate forecasts for the future development of the traffic scene. In particular, the future positions of dynamic objects in the traffic scene are determined in this case. Potential trajectories of all participants in the traffic scene are of particular interest in this case.

The task of planning is to generate or select a trajectory for the ego vehicle based on the prediction, namely in such a way that said trajectory satisfies the specified safety requirements and is also otherwise feasible and regulation-compliant. The selected trajectory should thus, e.g., be as collision-free as possible. The result of the planning is then controlled or implemented by means of the control system.

Prediction and planning are related problems. In both cases, future trajectories of road users of the traffic scene are determined. The behaviors of the individual road users influence each other in this case. The behavior of the ego vehicle then also affects the future trajectories of the other road users.

Prediction and planning are therefore not always clearly separable in practice. "Multimodal Trajectory Prediction Conditioned on Lane-Graph Traversals", Nachiket Deo, et al., [2106.15004] Multimodal Trajectory Prediction Conditioned on Lane-Graph Traversals (arxiv.org), describes a predictive variant based upon a graph-based scene representation of the current traffic scene. For this purpose, a model architecture is proposed having the following three components: a graph encoder, a so-called policy header, and a trajectory decoder. A graph-based scene representation is generated using the graph encoder and policy header. The trajectory decoder is used for the actual prediction. All three components are in each case implemented in the form of a pre-trained neural network.

The graph encoder generates a graph-based scene representation of the current traffic scene based on the information obtained at the perception level. A high-resolution map (HD map) is in this case shown as a directed graph. The directed graph is defined by a set of nodes and directed edges, in which case each directed edge connects exactly two nodes. In this way, both existing roadway courses and allowable travel directions are depicted in the scene representation.

The policy header maps a transition probability onto each directed edge of the graph of the scene representation. In the present context, this is the probability that the ego vehicle will move from the node from which the respective edge originates to the node to which that edge leads. According to the publication cited herein, the mapping of the transition probabilities is also carried out based on the information obtained at the perception level. The transition probabilities are in this case a part of the scene representation. At this point, it is noted that the transition probabilities can be given in any arbitrary measure, for example as a probability value between 0 and 1 or as a percent indication between 0% and 100%. It is only essential that the respective transition probability can be clearly derived from the measure.

The actual prediction of the future development of the traffic scene is made with the aid of the trajectory decoder, which generates a plurality of possible future trajectories for a selected road user. The predicted trajectories of the entire traffic scene are obtained by successively applying the model to each road user. According to the paper cited herein, the trajectory decoder in this case takes into account the transition probabilities of the scene representation and thereby focuses the prediction on "more likely" trajectories of the vehicle being considered.

Typically, neither training of the graph encoder nor training of the policy header of the conventional model architecture is limited to specified navigation destinations of the ego vehicle. Consequently, a specified navigation destination of the ego vehicle also has no effect on the prediction in this case, but can only be considered in the downstream planning.

SUMMARY

An object of the present invention is to improve the prediction and planning of graph-based behavioral planning with respect to the navigation destination of the ego vehicle.

This object may achieved according to the present invention by modifying at least a portion of the generated transition probabilities of the scene representation with respect to the specified navigation destination and by using the scene representation with the modified transition probabilities for planning.

By means of the measures according to the present invention, the result of the graph-based prediction can already be easily conditioned to a specified navigation destination. It is particularly advantageous that this does not require a neural network that is pre-trained specifically with respect to selected navigation destinations. Instead, the method according to the present invention can use already existing, pre-trained neural networks, such as the graph encoder, the policy header and the trajectory decoder of the model architecture described above, both for generating the graph-based scene representation and for generating potential future trajectories. Conditioning to a specified navigation destination is performed in this case at the road graph level, so the trajectory decoder can use all its resources for advantageous expedient trajectories.

The use of existing pre-trained networks is also advantageous because these networks have learned the full range of the behaviors seen in the training and are not limited to selected navigation destinations in this respect. The method according to the present invention is accordingly powerful.

At this point, it is expressly noted once again that the conditioning according to the present invention takes place to a specified navigation destination at the behavioral level, i.e., in connection with prediction. The planning of the trajectory of the ego vehicle, in which driving dynamics and ambient traffic are explicitly taken into account, is only indirectly affected by the measures according to the present invention, in that said planning uses the results of the prediction conditioned according to the present invention.

As mentioned above, the nodes and/or edges of the graph-based scene representation of the current traffic scene are linked to map information as part of the method according to the present invention in order to, e.g., depict existing road courses and permitted driving directions in the scene representation. In this context, it proves advantageous if the navigation destination of the ego vehicle is also linked to map information and is specified in the form of at least one destination location and/or at least one destination route. A destination location and/or destination route can, e.g., be input into and specified in a navigation system of the ego vehicle. However, based on such an input, the navigation system could also automatically determine further destination locations on the route to a destination location. This is particularly useful if the destination location is relatively far from the current location of the ego vehicle. In addition, obligatory stopping points, such as traffic lights, railroad barriers, etc., can also be considered in this manner.

In one advantageous embodiment of the method according to the present invention, the current position of the ego vehicle is determined and associated with at least one start node of the scene representation. Furthermore, at least one destination node of the scene representation is associated with the specified navigation destination. All sub-graphs of the scene representation linking the at least one start node and the at least one destination node are then determined to be expedient, whereas all remaining sub-graphs of the scene representation are determined not to be expedient. Each of these sub-graphs is defined by a subset of the set of nodes and directed edges of the graph of the scene representation.

In this case, the modification according to the present invention of at least a portion of the generated transition probabilities of the scene representation is carried out simply by increasing the transition probability of at least one edge of at least one expedient partial graph. Additionally or alternatively, the transition probability of at least one edge of at least one non-expedient partial graph can also be reduced.

Advantageously, the future development of the traffic scene is predicted using the scene representation having the modified transition probabilities.

By specifically increasing the transition probabilities of expedient partial graphs and selectively decreasing the transition probabilities of non-useful partial graphs, expedient routes can very easily be prioritized higher than non-expedient routes in the course of prediction.

If the transition probability of the edge of a non-expedient partial graph is set to zero, then this partial graph is only considered in the prediction up to the node from which the edge having the transition probability of zero originates. Said partial graph is then basically capped. In this way, non-expedient routes represented by non-expedient sub-graphs can even be entirely excluded from prediction and subsequent planning.

The sum of the transition probabilities of all directed edges originating from a particular node must be equal to one. Therefore, when modifying the transition probability of at least one directed edge originating from a particular node, the transition probabilities of the remaining directed edges originating from that particular node need to be normalized accordingly.

BRIEF DESCRIPTION OF THE DRAWINGS

Advantageous embodiments and refinements of the present invention are explained in more detail hereinafter, in conjunction with the figures and with reference to an exemplary embodiment.

DETAILED DESCRIPTION OF EXAMPLE EMBODIMENTS

Figure 1:
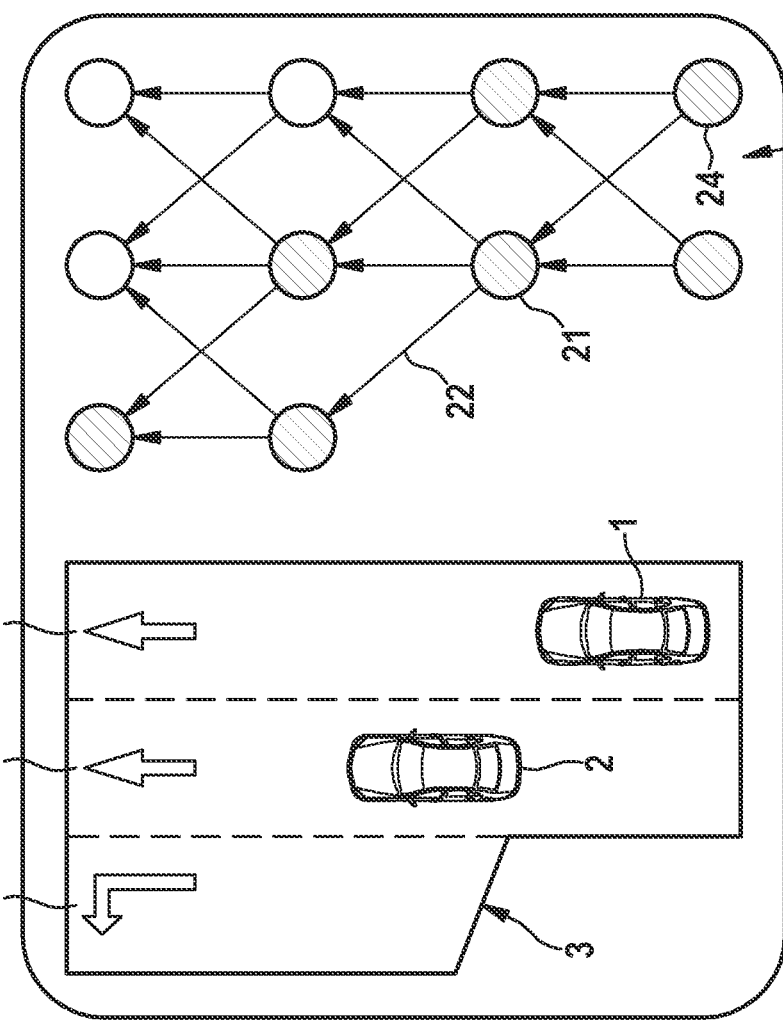
FIG. 1 shows a current traffic scene (left) and a graph of the scene representation of said traffic scene (right) generated as part of the method according to the present invention.

In the left part of FIG. 1, a current traffic scene 10 including an ego vehicle 1 and a further vehicle 2 is shown. Both vehicles 1 and 2 are located on a roadway 3, which can be driven only in one direction. The roadway 3 comprises two straight-ahead lanes 4 and 5. In the detail shown in this case, the roadway widens by a left-turn lane 6. The ego vehicle 1 is located in the right straight-ahead lane 4 in a roadway section behind the further vehicle 2, which is located in the left straight-ahead lane 5.

In the exemplary embodiment described in this case, the ego vehicle has been provided with a navigation destination that is outside the area shown in this case and is best reached by turning left.

According to the method of the present invention for behavior planning of an at least partially automated ego vehicle with a specified navigation destination, a graph-based scene representation 20 of the current traffic scene 10 is first generated. A pre-trained DL architecture having a graph encoder and a policy header can, e.g., be used as described in "Multimodal Trajectory Prediction Conditioned on Lane-Graph Traversals", Nachiket Deo, et al. In the present exemplary embodiment, a graph encoder linking the road infrastructure of the traffic scene to a high resolution map (HD map) was used to depict the course of the road, the individual lanes, and the allowable directions of travel as directed graph 20.

The right-hand portion of FIG. 1 illustrates that said directed graph 20 is defined by a set of nodes 21 and directed edges 22, of which respectively only one is provided with a reference character by way of example. The direction of an edge is in this case indicated by the corresponding direction of the arrow. The nodes 21 can each be associated with the centerline of a lane 4, 5 or 6. Given that each directed edge 22 connects exactly two nodes 21, the edges 22 describe neighborhood relationships and possible transitions between adjacent nodes 21. Using a policy header, a transition probability has been associated with each directed edge 22. This describes the transition probability for a correspondingly directed transition of the ego vehicle 1 between the connected nodes 21.

At this point, it is noted that the graph-based scene representation can also include further information, such as information about the ego vehicle and other road users. Using a correspondingly pre-trained graph encoder, the nodes can also be provided with an entry indicating whether or not said node is on a known route.

Figure 2:
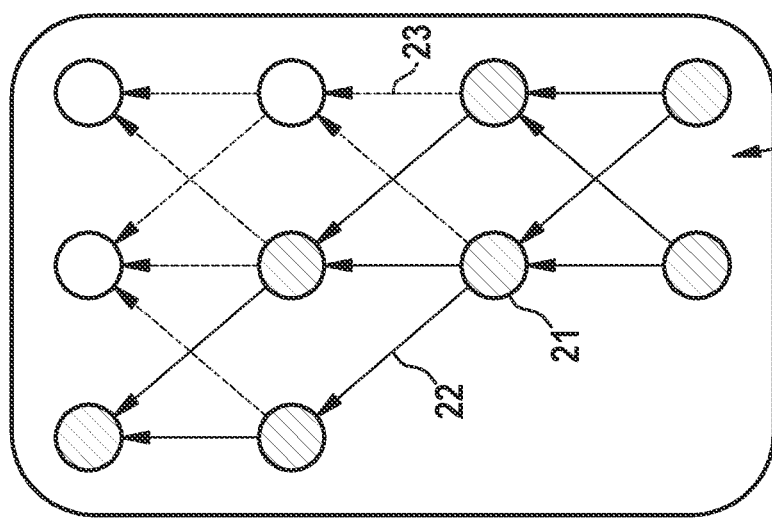
FIG. 2 illustrates the modification according to the present invention of the transition probabilities of the scene representation shown in FIG. 1.

According to the present invention, at least a portion of the generated transition probabilities of the graph-based scene representation 20 is modified with respect to the specified navigation destination. The resulting modified scene representation 25 is shown in FIG. 2. The modification of the transition probabilities is in this case illustrated in that, unlike in FIG. 1, a portion of the directed edges 23 is illustrated as dashed arrows, while another portion, as in FIG. 1, is still illustrated in the form of solid arrows 22.

The modification of the transition probabilities of the scene representation 20 is used to condition the prediction to the specified navigation destination of the ego vehicle 1. In the exemplary embodiment described here, the navigation destination was first linked to map information and provided in the form of a destination location. The current location of the ego vehicle 1 was then determined and associated with a start node 24 of the scene representation 20. A destination node was associated with the destination location, which is not shown here, however, because it is outside of the represented map detail. All of the expedient partial graphs of the scene representation 20 were then determined. These are the sub-graphs that connect the start node 24 and the destination node. The nodes 21 of these expedient sub-graphs are indicated by shading. All the remaining sub-graphs of the scene representation 20 were categorized as not being expedient. The nodes 21 of these non-expedient sub-graphs are not shaded.

Generally, there are various ways of modifying the transition probabilities of the scene representation to condition the prediction to the specified navigation destination of the ego vehicle. FIG. 2 shows a variant in which the transition probabilities of the edges 23 of all non-expedient partial graphs were set equal to zero. Accordingly, the transition probabilities of the remaining directed edges originating from the respective nodes have been re-normalized so that for all nodes, the sum of the transition probabilities associated with the outgoing edges is one in each case.

Figure 3:
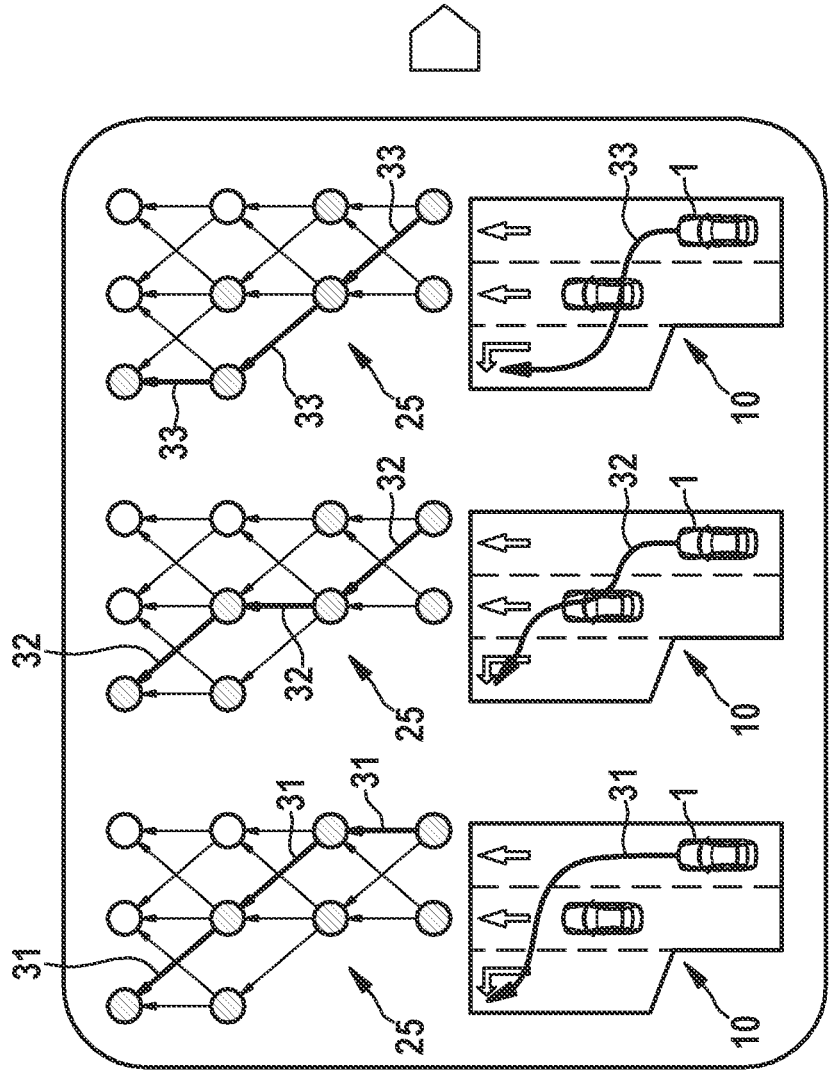
FIG. 3 illustrates the prediction based on the modified scene representation of FIG. 2.

In the exemplary embodiment described here, the future development of the traffic scene 10 is predicted using the scene representation 25 having the modified transition probabilities, which is illustrated by FIG. 3. A trajectory decoder generates, based on the modified transition probabilities, a specified number of graph traversals, i.e. a sequence of nodes. These represent a rough spatial path without time information and describe, at an abstract map level, the rough route that prediction is to follow. Trajectories are then decoded from said traversals. The trajectories are clustered to create the desired number of predicted trajectories. Another task of the trajectory decoder is to specify a speed profile for each of the predicted trajectories.

In the upper region of FIG. 3, three possible traversals 31, 32, and 33 are shown in the scene representation 25. Said traversals 31, 32, and 33 were predicated as potential future trajectories of the ego vehicle 1. In the prediction, only expedient partial graphs of the scene representation were considered, because all remaining partial graphs were excluded by zeroing the corresponding transition probabilities for the prediction. In the lower part of FIG. 3, the respective predicted trajectories 31, 32, and 33 of the ego vehicle 1 are shown in the traffic scene 10.

Figure 4:
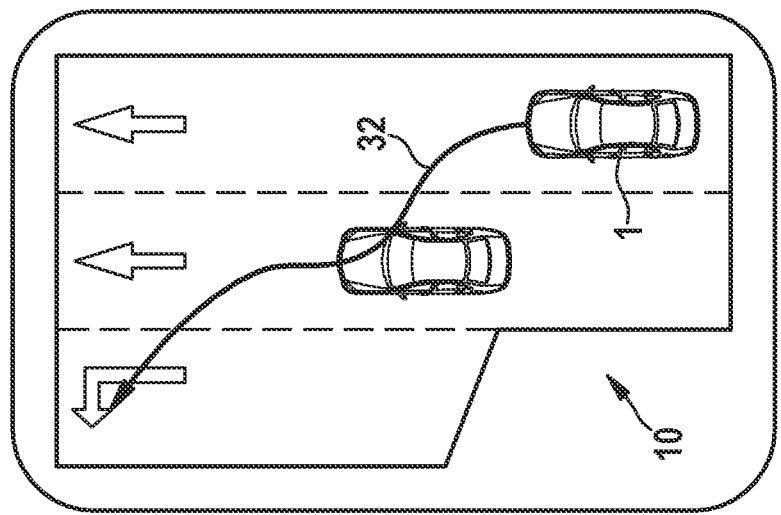
FIG. 4 illustrates planning based on the prediction shown in FIG. 3.

The behavior planning of the ego vehicle 1 took the future development of the traffic scene 10 into account by selecting one of the predicted possible traversals or trajectories, i.e. the trajectory 32, as the destination trajectory in order to implement said trajectory controlling the ego vehicle 1 accordingly. This is illustrated by FIG. 4.

Another very advantageous option for modifying the transition probabilities of the scene representation to condition the prediction to the specified navigation destination of the ego vehicle is to increase the transition probability of one or more edges of one or more expedient partial graphs and/or to decrease the transition probability of one or more edges of one or more non-expedient partial graphs. Expedient partial graphs can in this way be given a kind of bonus relative to non-expedient partial graphs.

The probabilities can be calculated using Softmax from an unnormalized "energy". Softmax($q\_i$, $\{q\}$) is strictly monotonic in $q\_i$, so an additive bonus term is often applied. One simple type is an additive term a prior to Softmax: $p\_i = \text{softmax}(q\_i, \{q\}) \rightarrow p\_i = \text{softmax}(q\_i + a; \{q\})$. The additional term a can be selected at the time of testing or can be learned during training.

Finally, it should also be noted that the method according to the present invention for the behavior planning of an ego vehicle can be varied by further specifications. Thus, traversals could, e.g., be cut off at the stop line of a red traffic light in order to prevent trajectories that break traffic rules from being predicted in connection with the method according to the present invention.

What is claimed is:

1. A computer-implemented method for behavior planning of an at least partially automated ego vehicle having a specified navigation destination, the method comprising:
   a. generating, (i) based on map data and sensor data captured by a sensor system of the ego vehicle as the ego vehicle is driving in an environment and (ii) by a computer system that includes at least one processor, a graph-based scene representation of a current traffic scene, that is formed of a graph defined by a set of nodes and directed edges, each directed edge connecting exactly a respective two of the nodes;
   b. associating, by the computer system, each of the directed edges with a transition probability that represents a likelihood that the ego vehicle will proceed with a corresponding directed transition between the connected nodes, the likelihood being independent of the specified navigation destination;
   c. generating, by the computer system, an updated version of the graph-based scene representation of the current traffic scene by modifying at least a portion of the initial transition probabilities based on whether the respective directed edge belongs to a path from a start node to a destination node associated with respect to the specified navigation destination, thereby generating a destination-conditioned scene representation comprising updated transition probabilities, wherein, for each of one or more pairs of the nodes:
      the updated version of the graph-based scene representation includes a respective plurality of parallel paths between the respective pair of nodes;
      each of the parallel paths is formed of a respective one or more of the edges;

each of the parallel paths has a respective transition probability; and the transition probabilities of the parallel paths are composed of those of the modified transitions probabilities that are respectively associated with the edges forming the parallel paths; and d. based on the destination-conditioned scene representation indicating a predicted future development of the traffic scene, the computer system selecting, and controlling the ego vehicle to perform, a driving maneuver.

2. The method according to claim 1, wherein the navigation destination of the ego vehicle is linked to map information and is specified and/or ascertained in the form of at least one destination location and/or at least one destination route associated with a destination node of the destination-conditioned scene representation.

3. The method according to claim 1, wherein;

a current location of the ego vehicle is determined and associated with at least one start node of the graph-based scene representation;

at least one destination node of the graph-based scene representation is associated with the specified navigation destination; and the method further comprises:

determining all partial graphs of the graph-based scene representation connecting the at least one start node and the at least one destination node to be expedient; and determining all remaining partial graphs of the graph-based scene representation to be non-expedient, wherein each of the partial graphs is defined by a subset of the set of nodes and the directed edges of the graph-based scene representation.

4. The method according to claim 3, wherein the transition probability of at least one edge of at least one of the expedient partial graphs is increased during the modification step that generates the destination-conditioned scene representation.

5. The method according to claim 3, wherein the transition probability of at least one edge of at least one of the non-expedient partial graphs is decreased during the modification step that generates the destination-conditioned scene representation.

6. The method according to claim 5, wherein the transition probability of at least one edge of at least one of the non-expedient partial graphs is set equal to zero during the modification step that generates the destination-conditioned scene representation.

7. The method according to claim 1, wherein, when performing the modification of the transition probability of at least one directed edge originating from a particular node, the transition probabilities of remaining directed edges originating from that particular node are normalized.

8. The method according to claim 1, wherein a pre-trained Deep Learning (DL) architecture is used to generate the graph-based scene representation, the DL architecture including a graph encoder and a policy header that allocates the initial transition probabilities to the respective directed edges prior to their modification.

9. The method according to claim 1, wherein multiple paths are categorized as expedient paths that start from the start node and reach the destination node and are retained in the graph after the modifying step, and each of the retained paths that are categorized as expedient is assigned a respective non-zero cumulative probability of the respective path being followed.

10. The method according to claim 9, wherein one or more paths are (i) categorized as non-expedient paths that start from the start node and (ii) based on the categorization as non-expedient, are assigned a transition probability of zero, with the retained paths that are categorized as expedient being normalized to form a valid probability distribution.

11. A computer-implemented method for behavior planning of an at least partially automated ego vehicle having a specified navigation destination, the method comprising:

a. generating, (i) based on map data and sensor data captured by a sensor system of the ego vehicle as the ego vehicle is driving in an environment and (ii) by a computer system that includes at least one processor, a graph-based scene representation of a current traffic scene, wherein the scene representation includes a set of nodes and a set of directed edges, each directed edge connecting exactly a respective two of the nodes, wherein the set of directed edges includes:

(i) a first set of directed edges representing potential movements of the ego vehicle; and (ii) a second set of directed edges representing potential movements of one or more traffic participants other than the ego vehicle;

b. associating, by the computer system, each directed edge of the first set with a respective transition probability that each:

(i) represents a likelihood of a corresponding directed transition of the ego vehicle between the connected nodes of the respective edge; and (ii) is based on whether the respective directed edge belongs to a path from a start node to a destination node associated with the specified navigation destination;

c. associating, by the computer system, each directed edge of the second set with a respective transition probability that is determined independently of any specified navigation destination; and d. based on the destination-conditioned scene representation indicating a predicted future development of the traffic scene, the computer system selecting, and controlling the ego vehicle to perform, a driving maneuver;

wherein, for each of one or more pairs of the nodes of the scene representation:

the scene representation includes a respective plurality of parallel paths between the respective pair of nodes;

each of the parallel paths is formed of a respective one or more of the edges;

each of the parallel paths has a respective transition probability; and the transition probabilities of the parallel paths are composed of those of the modified transitions probabilities that are respectively associated with the edges forming the parallel paths.

12. The method according to claim 11, wherein the navigation destination of the ego vehicle is linked to map information and is specified and/or ascertained in the form of at least one destination location and/or at least one destination route associated with a destination node of the graph-based scene representation.

13. The method according to claim 11, wherein:

a current location of the ego vehicle is determined and associated with at least one start node of the graph-based scene representation;

at least one destination node of the graph-based scene representation is associated with the specified navigation destination; and the method further comprises:

determining all partial graphs of the graph-based scene representation connecting the at least one start node and the at least one destination node to be expedient; and determining all remaining partial graphs of the graph-based scene representation to be non-expedient, wherein each of the partial graphs is defined by a subset of the set of nodes and the directed edges of the graph-based scene representation.

14. The method according to claim 13, wherein the transition probability of at least one directed edge of at least one of the expedient partial graphs is increased when associating the respective transition probabilities for the first set of directed edges.

15. The method according to claim 13, wherein the transition probability of at least one directed edge of at least one of the non-expedient partial graphs is decreased when associating the respective transition probabilities for the first set of directed edges.

16. The method according to claim 15, wherein the transition probability of at least one directed edge of at least one of the non-expedient partial graphs is set equal to zero.

17. The method according to claim 11, wherein, when associating the respective transition probabilities for a set of directed edges originating from a particular node, the transition probabilities of the edges originating from that node are normalized.

18. The method according to claim 11, wherein a pre-trained Deep Learning (DL) architecture is used to generate the graph-based scene representation, the DL architecture including a graph encoder and a policy header that allocates initial transition probabilities to the respective directed edges of the graph-based scene representation.

* * * * *